Patented Jan. 29, 1929.

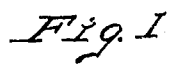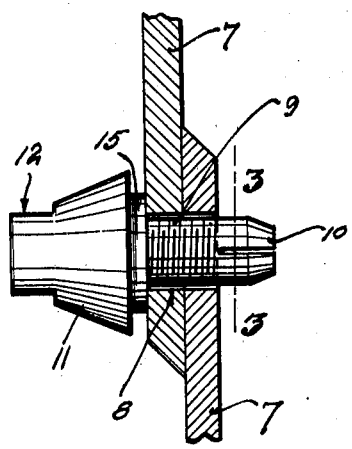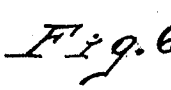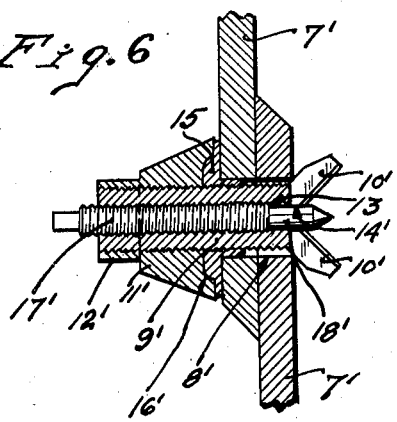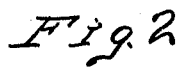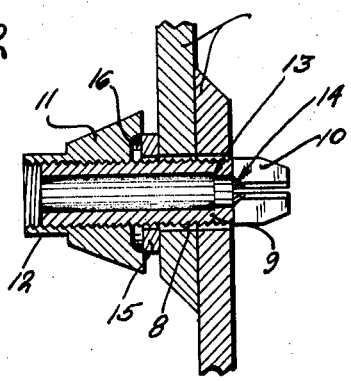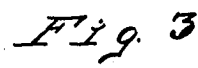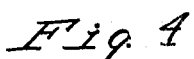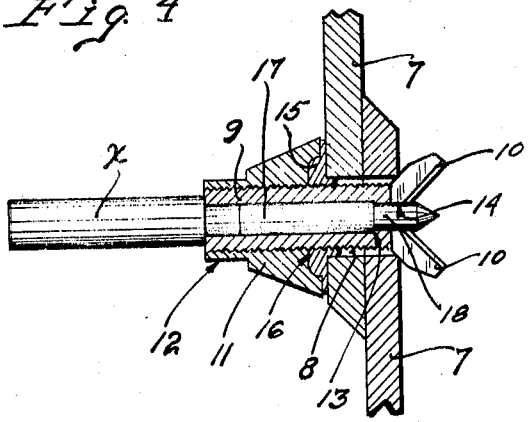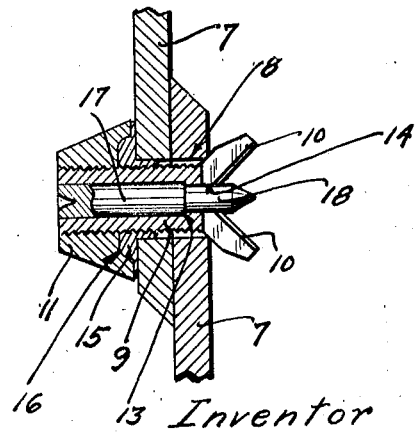

1,700,354

UNITED STATES PATENT OFFICE.

THOMAS MARTIN FOSS, OF MINNEAPOLIS, MINNESOTA, ASSIGNOR OF ONE-THIRD TO MERCHANT & KILGORE, A COPARTNERSHIP CONSISTING OF FRANK D. MERCHANT AND HARRY D. KILGORE, OF MINNEAPOLIS, MINNESOTA.

EMERGENCY RIVET.

Application filed January 24, 1927. Serial No. 163,143.

My present invention has for its object to provide an improved rivet intended for general use, but especially adapted for use as an emergency rivet.

Generally stated, the invention consists of the novel devices and combinations of devices hereinafter described and defined in the claim.

The improved rivet is extremely simple and strong with no loose parts to get out of order, and can be very quickly applied and tightened. Said rivet, when tightened, has a very powerful clamping action such as will pull tank or boiler sheets tightly together.

In the accompanying drawings, which illustrate the invention, like characters indicate like parts throughout the several views.

Referring to the drawings:

Fig. 1 is a view showing the assembled rivet in side elevation, inserted through a hole in tank or boiler sheets shown in section;

Fig. 2 is a view corresponding to Fig. 1 with the exception that the rivet is shown in longitudinal central section with some parts removed;

Fig. 3 is a transverse section taken on the line 3—3 of Fig. 1;

Fig. 4 is a view corresponding to Fig. 2 with the exception that the prongs have been spread and the nut tightened to connect the sheets;

Fig. 5 is a view corresponding to Fig. 4 with the exception that the nut extension has been cut off and the core upset to hold the same with the tool positioned to hold the prongs spread; and Fig. 6 is a view corresponding to Fig. 4 but showing a slight modification.

Referring first to the invention shown in Figs. 1 to 5, inclusive, the numeral 7 indicates a pair of tank or boiler sheets having a rivet hole 8 formed therein. The rivet body 9 is of cylindrical form and its inner or insertable end is chamfered to facilitate the insertion of said body through the rivet hole 8 in which it is adapted to fit. Said rivet body 9, at its insertable end, is longitudinally slit on quarters to form four prongs 10. The rivet body 9, except for the prongs 10, is externally screw-threaded and has applied thereto a nut 11. This nut 11 is shaped to give it the appearance of a rivet head, and formed with the outer face of said rivet is an extension 12, diametrically opposite sides of which are flattened for the application of a wrench, by which the nut may be turned. It may be here stated that after the rivet is applied to the sheets 7 and set, the nut extension is cut off.

The rivet body 9 is hollow throughout the full length of its threaded portion and the internal diameter thereof just outward of the prongs 10 is slightly reduced to afford a stop shoulder 13. A relatively small hole extends axially between the prongs 10 and the inner ends thereof are chamfered to afford heels 14, for a purpose that will presently appear.

A loose washer 15 is applied to the rivet body 9 at the working face of the nut 11, and said nut has a recess 16 in its working face, the diameter of which is substantially the same as that of said washer.

Within the rivet body 9 is a tight-fitting cylindrical core 17 having on its inner end a cylindrical pointed prong-spreading tool 18 of a diameter which snugly fits in the reduced bore in the rivet body 9 and with its pointed end between the heels 14 and axially aligned with the bore between said prongs. When the core member 18 is in this position in the rivet body 9, the inner end of the core 17 is axially spaced outward from the shoulder 13.

All of the rivet parts are made from steel with the exception of the washer 15 which is made of a much softer material, such as copper or lead. Before the assembled rivet is inserted into the bore 8, the nut 11 and washer 15 are adjusted on the rivet body 9 so that the distance between the inner ends of the prongs 10 and the working face of said washer is substantially the same as the thickness of the two sheets 7. With the assembled rivet thus adjusted, the same is inserted into the bore 8 until stopped by the engagement of the washer 15 with the outer sheet 7. A punch x is then placed against the outer end of the core 17 in axial alignment with the bore through the rivet body 9, and struck with a hammer to drive said core axially in the rivet body 9 until stopped by its engagement with the shoulder 13. During this axial movement of the core 17, the point of the core member 18 enters the bore between the prongs 10 and engages the heel 14 of said prongs, and spreads the same, as shown in Fig. 4. At the limit of the projecting movement of the tool 18, the heels 14 rest on the cylindrical body of said stool and thus positively hold the prongs 10 spread. The nut 11 is then tightened by turning the same by means of a wrench applied to the nut extension 12. During the tightening of the nut 11, the prongs 10 engage the inner sheets 7 as a base of resistance, and hold the rivet body 9 against axial outward movement, and at which time the washer 15 will be upset and distorted and forced into tight engagement with the adjacent thread on the rivet body 9, thereby forming a fluid-tight joint. A portion of the metal in the washer 15, during the upsetting thereof, will be caused to flow in a thin film between the outer edge portion of the nut 11 and the adjacent sheet 7 and thereby form a very tight joint. Under the powerful drawing action of the nut 11 the anchoring prongs 10, by the engagement of their heels 14 with the cylindrical body of the core member 18, will positively and firmly hold against the inner sheet 7 as a base of resistance and the tank or boiler sheets 7 will be tightly drawn together so as to form a fluid-tight joint therebetween. It will also be noted that during the drawing action of the nut, above explained, the angularly disposed prongs 10 will be drawn into wedging engagement with the rear end of the bore 8 and causing the heels 14 of the prongs 10 to bite into the cylindrical surface of the core member 18, thereby locking the core portion 17 in engagement with the shoulder 13 and preventing withdrawal or any axial movement of the core member under wedging and clamping action of the spring prongs during drawing action by the nut. After the rivet has been tightened, as shown in Fig. 4, the nut extension 12 and the outer end portion of the rivet body 9 are sawed off at the outer face of the nut 11 and then the core 17 is upset or expanded by means of a center punch, not shown, to securely hold said core with the core member 18 positioned between the prongs 10 to positively hold the same spread, as shown in Fig. 5.

Referring now to the improved rivet, as shown in Fig. 6, the parts thereof corresponding to like parts, shown in Figs. 1 to 5, inclusive, are given the same reference numerals with the exception of an added prime. In this modification, the core 17' has screw-threaded engagement with the rivet body 9', and on the outer end thereof is an extension for the application of a wrench for turning the core 17' to project the core member 18' into the position to spread and hold the prongs 10'. Obviously, this screw-threaded engagement of the core 17' with the rivet body 9', will securely hold the core member 18' positioned to positively hold the prongs 10' spread.

What I claim is:

An emergency rivet comprising a hollow rivet body externally threaded and having at its insertable end a plurality of circumferentially spaced integral prongs normally lying substantially parallel to the axis of said body, said prongs having pointed heels inwardly spaced from their free ends, a cylindrical core in said body for spreading the prongs by engagement between said heels, and a nut having threaded engagement with the body, whereby when the prongs are spread the heels engage and lock with the cylindrical core as a base of resistance against the action of the nut and hold the core against axial movement into a position to release the prongs under drawing action.

In testimony whereof I affix my signature.

THOMAS MARTIN FOSS.